United States Patent [19]

Dupon

[11] 3,919,745
[45] Nov. 18, 1975

[54] SYSTEM FOR ASSEMBLING TWO PARTS AND A SLIDING FASTENER SLIDER INCLUDING APPLICATION THEREOF

[75] Inventor: Michel Dupon, Airaines, France

[73] Assignee: Fermeture Ailee S.A., Airaines, France

[22] Filed: Sept. 3, 1974

[21] Appl. No.: 502,497

[30] Foreign Application Priority Data
Sept. 5, 1973 France .............................. 73.31964

[52] U.S. Cl............. 24/205.14 R; 403/279; 403/281
[51] Int. Cl.² ..................... A44B 19/30; F16B 1/00
[58] Field of Search.................... 403/281, 279, 274; 24/205.14 R, 205.14 K; 29/207.5 SL

[56] References Cited
UNITED STATES PATENTS
1,989,955  2/1935  Van Patter........................... 403/281
FOREIGN PATENTS OR APPLICATIONS
1,022,597  7/1950  France ......................... 24/205.14 R
885,858   9/1942  France ......................... 24/205.14 R
480,351   1/1952  Canada ......................... 24/205.14 R
119,137   4/1943  Australia....................... 24/205.14 R Primary Examiner—Paul R. Gilliam
Assistant Examiner—Kenneth J. Dorner
Attorney, Agent, or Firm—Burns, Doane, Swecker & Mathis

[57] ABSTRACT

The system for assembling two parts comprises on a first part, composed of easily deformable material, two projecting teeth spaced a short distance apart. A second of the parts has a flange carrying a tenon which is engageable between the two teeth. The second part defines a surface which is substantially in the shape of a portion of cylinder and extends laterally from the flange above the tenon and the teeth. The curvature of this surface is such that, when the two parts are pressed together and the tenon is engaged between the teeth, the effect of the surface is to bend the teeth toward each other over and above the tenon and thereby cause the two parts to be held together by the trapping of the tenon between the bent teeth.

8 Claims, 4 Drawing Figures

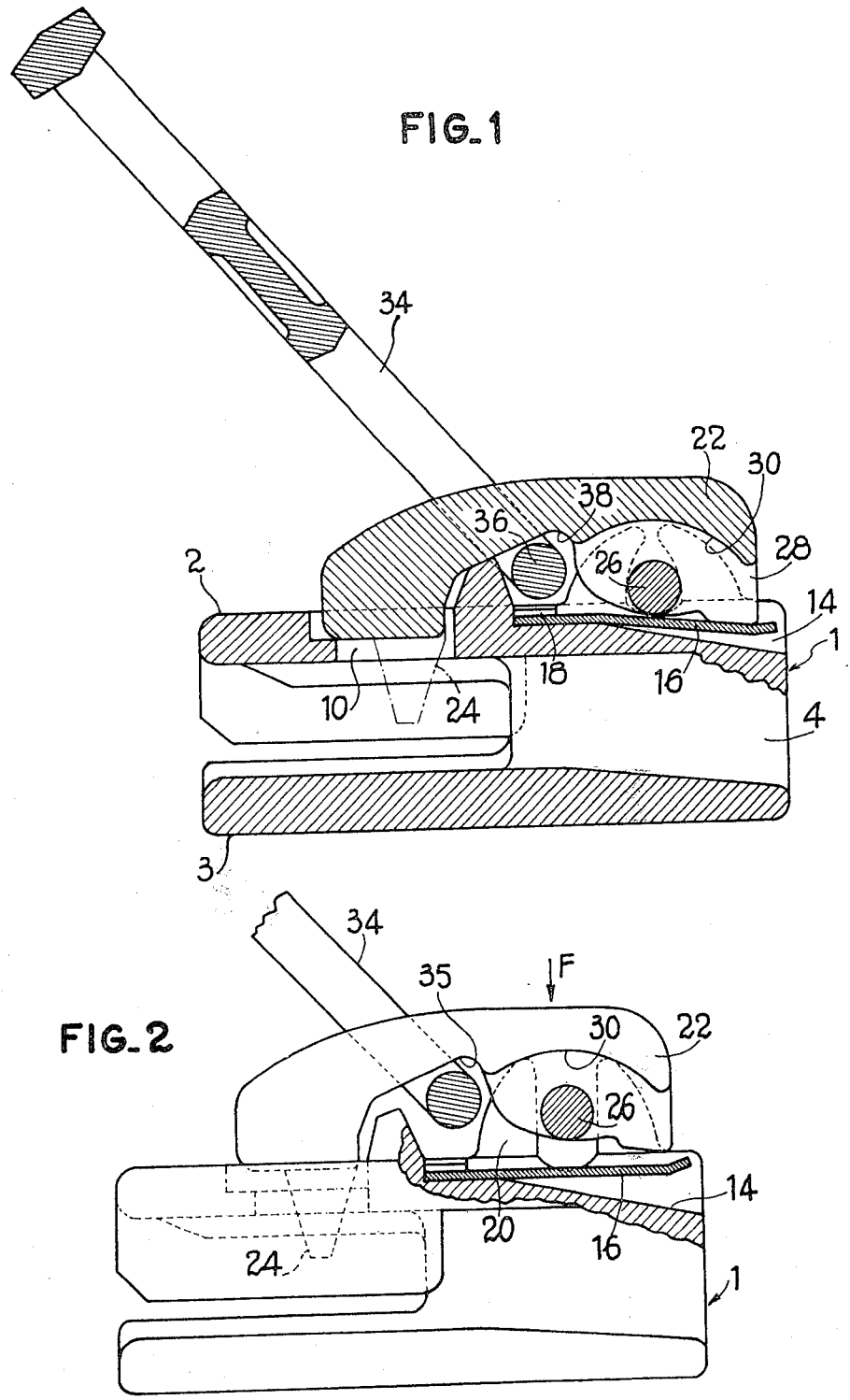
FIG_1
FIG_2

FIG_3
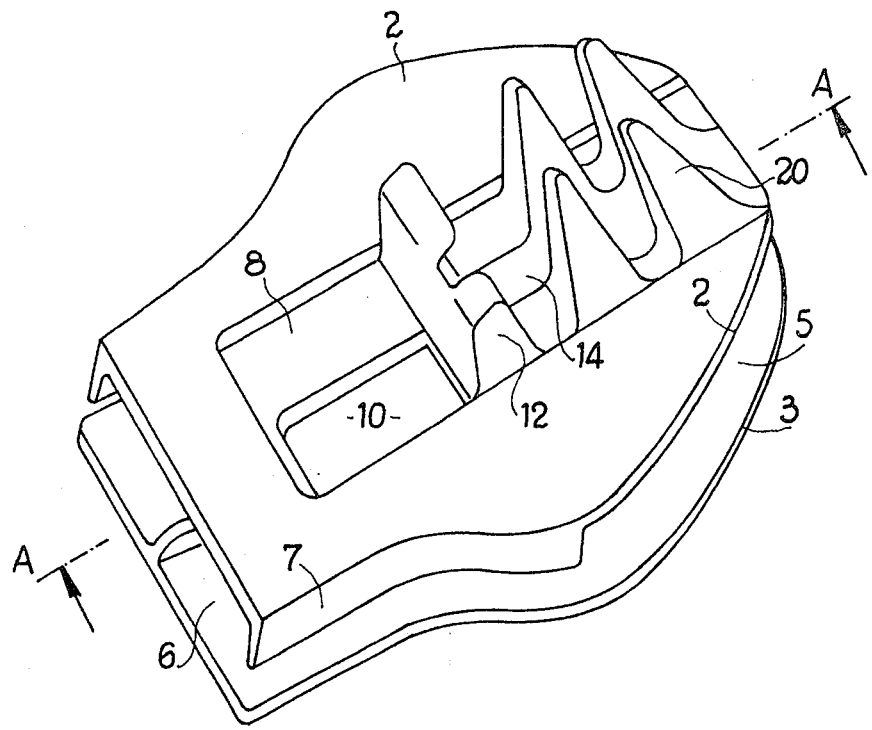
FIG_4
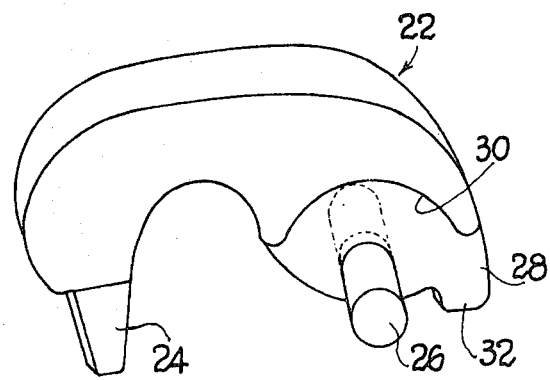

SYSTEM FOR ASSEMBLING TWO PARTS AND A SLIDING FASTENER SLIDER INCLUDING APPLICATION THEREOF

The present invention relates to a system for assembling which is more particularly adapted for the definitive and substantially invisible assembly of two parts of easily deformable material. This assembling system is particularly appropriate for the manufacture of sliding fastener sliders which comprise a body on which is mounted a locking pawl pivotable about an axis perpendicular to the direction of sliding of the sliding fastener and in particular for the assembly of the body and pawl.

At the present time the body and pawl are fixed to each other by various clipping or fastening methods all of which require complex and therefore costly machines. Now, the system according to the present invention overcomes these drawbacks by ensuring assembly by a simple application of pressure, it being possible to unite the two parts even when access can be had to only one side of these two parts.

This system comprises, on a first of the parts, at least two projecting teeth spaced a short distance apart and disposed in facing relation and, on the second part, at least one flange which has a general direction parallel to the teeth and carries a tenon fitting between the two teeth and is extended laterally above the tenon and the two teeth by means defining a surface substantially in the shape of a portion of a cylinder whose curvature is such that, under the effect of a pressure exerted in a direction to move the two parts toward each other, it is capable of bending the two teeth toward each other over and above the tenon.

The parts are assembled therefore by simply exerting a pressure on one of the parts, preferably on the second part. Owing to the fact that they are disposed in facing relation, the teeth are automatically bent toward each other under the effect of the moving of the parts toward each other and trap the tenon. The two parts are thus rigidly assembled with no intervention of outside means.

It will be understood that the exertion of the pressure does not require means of particular form, it being achieved by very simple and even conventional tools.

Another object of the invention is to provide a sliding fastener slider or other device comprising an assembly of this type and in particular to automatically locked sliders which include a body on which is mounted a pivotable locking pawl which is urged to its operative position by elastically yieldable means. According to the invention, such a slider comprises a body which has in its upper part two pairs of teeth, facing each other and slightly spaced apart in each pair, and spring strip which extends longitudinally between the pairs of teeth, the front end of the strip being free, and locking means carrying the locking pawl at one of its ends and constituting adjacent its opposite end above the two pairs of teeth two surfaces which are substantially in the form of a portion of a cylinder and are separated by a flange through which extends a pin which fits between the two teeth of each pair, said teeth being bent around said pin between said pin and the corresponding substantially cylindrical surface.

Such a slider is preferably constructed from an easily deformable material such as that sold under the trade name "Zamak."

The body and the locking element of the slider are assembled rapidly by pressure exerted on the back of the locking element. This pressure may be exerted in an automatic manner by a tool of simple shape which permits massproduction at a high rate, that is to say low-cost manufacture.

The following description of one embodiment of such a slider will show more clearly the advantages and features of the invention.

In the accompanying drawings:

FIG. 1 is a longitudinal sectional view of a slider having an assembling system according to the invention;

FIG. 2 is a side elevational view of the slider before its assembly, a part thereof having been cut away;

FIG. 3 is a perspective view to an enlarged scale of the body of the slider shown in FIGS. 1 and 2, and FIG. 4 is a perspective view of the locking element of the slider.

The slider illustrated in the drawings comprises in the known manner a body 1 having two parallel walls, respectively an upper wall 2 and lower wall 3 which are partially interconnected by a partition wall 4 so as to constitute (FIG.2) two separate passages 5 for the hooking elements of the sliding fastener when it is being opened and a single passageway 6 in which the hooking elements are united when the fastener is being closed. This uniting passageway 6 is narrowed in the direction of the end of the slider and is defined laterally by flanges perpendicular to the upper wall 2. To simplify the description the slider will be considered with respect to the direction in which it has its closing action, the passages 5 being therefore inlet passages for the hooking elements and being at the front of leading end of the slider and the passage 6 being an outlet passage located at the rear end of the slider.

Formed on the outer face of the wall 2 is a longitudinal recess 8 which is provided above the outlet passage 6 with a lateral aperture 10 adapted to permit the passage of a locking pawl. Extending across the recess is a transverse rib 12 from which extends a longitudinal recess 14 whose depth increases in the direction of the front end of the slider (FIG. 1) and which forms a cavity for a spring strip 16 whose front end is free whereas its rear end is clipped or fastened on a cross member 18 in the vicinity of the rib 12.

Two pairs of teeth 20 project outwardly on each side of the recess 14 and of the spring strip 16. The two teeth 20 of each pair are disposed in facing relation and are spaced a short distance apart.

Mounted above the body 1 is a locking element 22 having a generally curved shape (FIG. 4) which is extended adjacent one of its ends by a locking pawl 24 and adjacent its opposite end by a flange 28 which extends in a direction substantially parallel to the direction of the teeth 20 and is capable of fitting between the two pairs of teeth above the recess 14. This flange 28 has a tenon or pin 26 which extends therethrough and is adapted to fit between the teeth 20 of each one of the pairs of teeth of the body 1. On each side of this flange 28, portions defining two surfaces 30 in the form of a portion of a cylinder extend over the pin 26 and connect the flange 28 to the body of the locking element 22. The flange 28 is moreover extended at its front end, below the pin 26, by a boss 32.

When as shown in FIG. 2 the pin 26 of the locking element 22 is placed between the two teeth at each one of the pairs of teeth, the surfaces 30 are located above these pairs of teeth and the pawl 24 is introduced in the aperture 10. If a pressure is exerted on the back or top of the locking element 22 at for example F, each surface 30 urges the two teeth 20 of each pair of teeth toward each other so that they are bent or curved around the pin 26 and thereby connect the locking element 22 and the body 1. The pressure on the element 22 brings the portion 32 into abutment with the spring strip 16 then urges the latter against the bottom of the recess 14. The assembly of the two parts is now terminated. The locking element however defines a slight clearance with the body 1 owing to the elasticity of the strip 16. It can therefore pivot about the pin 26.

In the conventional manner and before achieving this assembly, a slider-pulling member 34 one end of which constitutes a ring is slid along the locking element 22 in such manner that the transverse end bar or pin 36 is placed in a cavity 35 in the element 22 between the surfaces 30 and the pawl 24. When the locking element is being placed in position, this pin 36 places itself between the rear teeth of the two pairs of teeth and the rib 12 of the body 1.

Just above the cross member 18, the assembling of the locking element 22 with the body 1 encloses or traps this pin 36 in the passage defined between the rib, the recess 35, the rear teeth and the cross member. Thus the pulling member is assembled at the same time as the locking element.

The pulling member 34 controls the operation of the slider in the usual manner. When it is inclined, for example in the position shown in FIG. 1, it tends to raise the locking element so that the latter pivots slightly forwardly about the pin 26 and the pawl 24 does not bear against the hooking elements of the sliding fastener. This slider can then be shifted freely forwardly or rearwardly. On the other hand, when it is not subjected to any pull, the locking element and consequently the pawl 24 are biased by the spring 16. The pawl 24 can be urged by the action of this spring against the hooking elements of the sliding fastener which enter through the passages 4 but is locked further by any force exerted by the already interhooked hooking elements located in the passage 6. The slider therefore ensures an automatic locking.

It is however constructed in a very simple manner and is very cheap, since it is sufficient to exert a simple pressure by any tool on one of the sides of the slider to assemble the various component parts.

The various parts, and in particular the teeth 20 of the slider, are constructed from an easily deformable material, for example the material at present sold under the trade name "Zamak" which is an alloy of zinc, aluminium, copper and magnesium.

Although the description and drawings concern a sliding fastener slider it will be understood that other apparatuses or devices may include the assembling system according to the invention. This system is indeed applicable whenever it is desired to effect a solid and definitive assembly which does not have elements or portions extending outwardly and can be constructed from an easily deformable material. Its simplicity, its low cost and its pleasing appearance render it advantageous for all kinds of applications. The number of pairs of teeth and the number of flanges 28 may of course vary in accordance with the shape and dimension of the parts to be assembled.

Having now described my invention what I claim as new and desire to secure by letters patent is:

1. A sliding fastener slider comprising a body, a locking member carrying a locking pawl adjacent a first end of the locking member for locking the slider in position on the fastener, two pairs of teeth which extend from an upper part of the body, the teeth of each pair facing each other and being spaced a short distance apart in a given direction, the pairs of teeth being spaced apart transversely of said given direction, a spring strip which extends between the pairs of teeth substantially in said given direction, means on said body for holding a first end of said strip, an end portion of said strip opposed to said first end being free, said free end portion of the strip being cooperative with an end portion of the locking member opposed to said first end of the locking member for biasing the locking member in a direction to put the pawl in an operative locking position, the locking member carrying a flange extending substantially in said given direction between the pairs of teeth, the locking member defining two surfaces which are substantially in the form of a portion of a cylinder and are separated by the flange and engage the teeth of the corresponding pairs of teeth, a pin which fits between the two teeth of each pair and extends from each side of the flange, said teeth of each pair being bent around the pin and extending between the pin and the corresponding substantially cylindrical surface.

2. A slider as claimed in claim 1, wherein the upper part of the body has between the pairs of teeth a longitudinal recess for receiving the spring strip, the depth of the recess increasing toward the free end portion of the spring strip.

3. A slider as claimed in claim 2, wherein the flange of the locking member is extended in its lower part by a boss abutting the free end portion of the spring.

4. A slider as claimed in claim 1, wherein the upper wall of the body carries a transverse rib defining with adjacent teeth of said pairs of teeth and with the locking member a passage for receiving a transverse portion of a slider pulling member.

5. A system for assembling two parts, said system comprising, on a first of said parts which is composed of easily deformable material, two projecting teeth spaced a short distance apart in a given direction and disposed in facing relation and, on a second of said parts, a flange which extends in a general direction parallel to said given direction, a tenon engageable between the two teeth and carried by the flange, means defining a surface which is substantially in the shape of a portion of a cylinder and extends laterally from the flange above the tenon and the teeth, said surface having such curvature that, under the effect of a pressure exerted in a direction to relatively move said two parts toward each other and cause the teeth to be urged against said surface, said surface is capable of bending the two teeth toward each other over and above the tenon.

6. A system as claimed in claim 5, wherein the flange of the second part comprises an abutment contacting the first part.

7. A system for assembling two parts, said system comprising on a first of said parts which is composed of easily deformable material, two pairs of projecting teeth, the teeth of each pair being spaced a short distance apart in a given direction and disposed in facing relation, each pair of teeth being spaced apart transversely of said given direction, a flange which is carried by a second of said two parts and extends in a general direction parallel to said given direction and is disposed between the pairs of teeth, a tenon carried by said flange and extending laterally from each side of said flange and engaged between the teeth of each pair of teeth, means defining two surfaces extending laterally from both sides of the flange each of which surfaces is substantially in the shape of a portion of a cylinder and extends laterally from the flange above the tenon and the corresponding pair of teeth, said surfaces having such curvature that under the effect of a pressure exerted in a direction to relatively move said two parts toward each other and cause the teeth to be urged against saidi surfaces, said surfaces are capable of bending the two teeth of the corresponding pair of teeth toward each other over and above the tenon.

8. A system as claimed in claim 5, wherein the two parts are composed of the material known under the trade name "Zamak."

\* \* \* \* \*